Patented Sept. 25, 1928.

1,685,674

UNITED STATES PATENT OFFICE.

PATRICK J. KELLEHER, OF SALEM, MASSACHUSETTS.

BATTERY COMPOSITION.

No Drawing. Application filed March 16, 1926. Serial No. 95,149.

The present invention relates to an electrolyte for electric storage batteries and to a dry or substantially dry composition for quickly and simply preparing such electrolyte. More particularly my invention relates to a composition for use in connection with the sulphuric acid electrolyte of a storage cell and to the electrolyte resulting after the addition of the composition to the sulphuric acid electrolyte.

One of the objects of my invention is the production of an electrolyte which will remove sulphate from the electrodes of storage cells which have been in use, and which will also prevent the formation of sulphate. As is well known, the action of sulphuric acid on lead plates causes a substance known as sulphate to form on the surface of the plates, and this coating of sulphate renders such plates less and less active as the use of the cells continues. This sulphate, moreover, tends to cause overheating of the cell or battery which results in distortion of the plates of the cells and shorter cell or battery life. As a result of the elimination of the sulphate from the electrodes and the use of my composition, overheating in charging and discharging is largely if not completely avoided. Warping and buckling of the cell or battery plates is therefore eliminated, and as a consequence the life of the cell is greatly extended.

A further object of my invention resides in the production of a composition or electrolyte which will not only accomplish the purposes indicated above, but will also lessen the disintegrating or decomposing action of the sulphuric acid upon the wooden or other separator plates and materials used in the construction of the cell. By thus maintaining the separator plates in operative condition and eliminating the deleterious action of sulphate a cell of extraordinary efficiency and length of life results from the use of the composition and electrolyte of this present invention. Other objects and merits of the invention will be pointed out or appear obvious in the detailed description which follows.

The dry composition forming the subject matter of the invention and accomplishing the above objects includes the following substances: magnesium sulphate, ammonium sulphate, potassium sulphate, and aluminium sulphate. Substantially pure chemicals should be employed and preferably chemicals substantially free of iron compounds. The action of these chemicals alone in combination, without the addition of glycerine or alcohol or like substances, will eliminate and prevent the formation of sulphate and will lessen the deteriorating action of the sulphuric acid upon the wooden or like separator plates or other construction materials used in the cells which are subject to decomposition by the action of the acid. The best results, according to my observations, are obtained when all the ingredients used are present in the form of sulphates and mixed or compounded in substantially the following proportions:

|  | Parts by weight. |
|---|---|
| Magnesium sulphate | 84 |
| Ammonium sulphate | 3 |
| Potassium sulphate | 6 |
| Aluminium sulphate | 7 |
|  | 100 |

The ingredients compounded in the stated proportions are finely pulverized and mixed, or the ingredients are first finely pulverized individually and then mixed in the proportions indicated. In either manner of preparation, there results a fine dry powder capable of being easily added to and dissolved in the sulphuric acid electrolyte ordinarily used in storage batteries. The powder is to be dissolved in the sulphuric acid electrolyte when the latter is preferably of not less than 1.170 specific gravity in the proportion of preferably about one-half pound of the composition to each gallon of electrolyte.

Having described my invention what I claim and desire to secure by Letters Patent is pointed out, as required by the statutes relating to patents, in the following claims, it being understood that the specific proportions recited may be varied within limits without departing from the invention as will be understood by persons skilled in the art:

1. A substantially dry composition capable of preventing the formation of sulphate in storage cells comprising substantially 84 parts by weight of magnesium sulphate, 3 parts by weight of ammonium sulphate, 6 parts by weight of potassium sulphate, and 7 parts by weight of aluminium sulphate.

2. A battery composition capable of preventing the formation of sulphate in storage cells utilizing sulphuric acid as an electrolyte which consists of substantially 84 parts by weight of magnesium sulphate, 3 parts by weight of ammonium sulphate, 6 parts by weight of potassium sulphate, and 7 parts by weight of aluminium sulphate.

3. A storage battery electrolyte containing sulphuric acid of substantially not less than 1.170 specific gravity admixed with a mixture prepared from substantially 84 parts by weight of magnesium sulphate, 3 parts by weight of ammonium sulphate, 6 parts by weight of potassium sulphate, and 7 parts by weight of aluminium sulphate in the proportion of substantially one-half pound of mixture to one gallon of sulphuric acid electrolyte.

In testimony whereof I affix my signature.

PATRICK J. KELLEHER.